US010732273B2

(12) United States Patent
Lim et al.

(10) Patent No.: US 10,732,273 B2
(45) Date of Patent: Aug. 4, 2020

(54) RADAR DEVICE FOR VEHICLE AND METHOD FOR ESTIMATING ANGLE OF TARGET USING SAME

(71) Applicant: MANDO CORPORATION, Gyeonggi-do (KR)

(72) Inventors: HaeSueng Lim, Gyeonggi-do (KR); JaeEun Lee, Seoul (KR); Seong Hee Jeong, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 447 days.

(21) Appl. No.: 15/286,463

(22) Filed: Oct. 5, 2016

(65) Prior Publication Data

US 2017/0102453 A1    Apr. 13, 2017

(30) Foreign Application Priority Data

Oct. 7, 2015    (KR) .................. 10-2015-0140878

(51) Int. Cl.
*G01S 13/44* (2006.01)
*G01S 13/931* (2020.01)
(Continued)

(52) U.S. Cl.
CPC ...... *G01S 13/4418* (2013.01); *G01S 13/4454* (2013.01); *G01S 13/4463* (2013.01);
(Continued)

(58) Field of Classification Search
CPC .. G01S 7/411; G01S 13/4463; G01S 13/4418; G01S 13/42; G01S 13/931; G01S 13/4454; G01S 2013/0245; G01S 13/72
See application file for complete search history.

(56) References Cited

U.S. PATENT DOCUMENTS 3,761,927 A  *  9/1973  Amoroso, Jr. ............ G01S 3/48
                                                         342/156
5,581,620 A  *  12/1996  Brandstein ........... G10K 11/346
                                                         367/125
(Continued)

FOREIGN PATENT DOCUMENTS

KR    10-2014-0083708         7/2014

*Primary Examiner* — Matthew M Barker
(74) *Attorney, Agent, or Firm* — Ladas & Parry, LLP

(57) ABSTRACT

The present invention relates to a radar device for a vehicle which may determine a target as a single target or multiple targets according to a dispersion level of a slope for each reception channel, calculated through a phase difference for each reception channel of a reflection signal and an arrangement interval for each reception channel, and estimate the angle of the target so as to acquire the angle of the target using a small amount of calculations, and a method for estimating the angle of a target using the same. An embodiment of the present invention provides a radar device for a vehicle, which detects a target located in the front side of a vehicle, comprising an electronic control unit configured to: calculate the slope of a reflection signal received for each reception channel, using a phase difference for each reception channel of the reflection signal and an arrangement interval for each reception channel, wherein the reflection signal is obtained by transmitting a predetermined transmission signal and receiving the transmitted transmission signal which is reflected back from the target; and determine the target as a single target or multiple targets according to a dispersion level of the calculated slope so as to estimate the angle to the determined target.

9 Claims, 6 Drawing Sheets

(51) Int. Cl.
     *G01S 13/42*   (2006.01)
     *G01S 13/72*   (2006.01)
     *G01S 13/02*   (2006.01)

(52) U.S. Cl.
     CPC ............. *G01S 13/931* (2013.01); *G01S 13/42* (2013.01); *G01S 13/72* (2013.01); *G01S 2013/0245* (2013.01)

(56) References Cited

U.S. PATENT DOCUMENTS

| | | | | |
|---|---|---|---|---|
| 5,661,485 | A * | 8/1997 | Manuel | G01S 7/288 342/100 |
| 7,190,305 | B2 * | 3/2007 | Isaji | G01S 7/354 342/107 |
| 7,301,496 | B2 * | 11/2007 | Honda | G01S 13/4454 342/107 |
| 7,612,706 | B2 * | 11/2009 | Honda | H01Q 25/02 342/107 |
| 7,936,302 | B2 * | 5/2011 | Brandwood | H01Q 3/267 342/165 |
| 8,994,581 | B1 * | 3/2015 | Brown | G01S 13/931 342/127 |
| 9,470,777 | B2 * | 10/2016 | Arage | G01S 7/41 |
| 9,784,820 | B2 * | 10/2017 | Arage | G01S 7/41 |
| 2015/0061923 | A1 * | 3/2015 | Sato | G01S 13/4454 342/149 |
| 2015/0130655 | A1 * | 5/2015 | Aizawa | G01S 3/74 342/147 |
| 2015/0204972 | A1 * | 7/2015 | Kuehnle | G01S 13/931 342/156 |
| 2017/0254882 | A1 * | 9/2017 | Malik | G01S 7/412 |

* cited by examiner

RADAR DEVICE FOR VEHICLE AND METHOD FOR ESTIMATING ANGLE OF TARGET USING SAME

CROSS REFERENCE TO RELATED APPLICATION

This application claims priority from Korean Patent Application No. 10-2015-0140878, filed on Oct. 7, 2015, which is hereby incorporated by reference for all purposes as if fully set forth herein.

BACKGROUND OF THE INVENTION

1. Field of the invention

The present embodiment relates to a radar device for a vehicle and a method for estimating the angle of a target using the same and, more particularly, to a radar device for a vehicle, which may determine a target as a single target or multiple targets according to a phase difference for each reception channel of a reflection signal and a relative phase difference for each reception channel calculated through an arrangement interval for each reception channel, and estimate the angle of the target so as to acquire the angle of the target using a small amount of calculations, and a method for estimating the angle of a target using the same.

2. Description of the Prior Art

A radar using a Frequency Modulation Continuous Wave (FMCW) Array Antenna scheme extracts the angle of a target using a phase difference of a signal received by a plurality of receiving antennas arranged in a predetermined direction.

A conventional beamforming scheme among various algorithms for estimating an angle using such a phase difference is generally used due to advantages of stability of algorithms and a small amount of calculations.

However, even a conventional beamforming scheme has a disadvantage of increasing the amount of calculation by multiplex matrix calculations during a process for acquiring a power spectrum when a Field of View (FoV) is widened or the accuracy of an angle is intended to be improved.

Also, since the angular resolution for a multiple target situation has been limited in an identical antenna environment, a high resolution algorithm having a large amount of calculations needs to be applied in order to improve a multiple target angular resolution.

However, a high resolution algorithm shows a big difference in relation to the amount of calculation, and thus causes a waste of calculation for a single target to which the same cannot be applied. Further, it is required to distinguish a single target situation from a multiple target situation in order to avoid such a waste, but the determination therebetween is ambiguous.

(Patent document 1) Republic of Korea Patent Application Publication No. 2014-0083708 (2014 Jul. 4) entitled "Rader device and phase variation compensation method applied thereto".

SUMMARY OF THE INVENTION

The purpose of the present embodiment is to provide a radar device for a vehicle which may determine a target as a single target or multiple targets according to a phase difference for each reception channel of a reflection signal and a dispersion level of a slope for each reception channel calculated through an arrangement interval for each reception channel, and estimate the angle of the target so as to acquire the angle of the target by using a small amount of calculations, and a method of estimating the angle of a target using the same.

An embodiment for achieving the purpose provides a radar device for a vehicle, including: a transmission unit for transmitting a transmission signal for detecting a target; a reception unit for receiving a reflection signal of the transmission signal through a plurality of array antennas; a calculation unit for calculating relative phase information for each channel by using the reflection signal received through each of the plurality of array antennas; and a target determination unit for determining whether the target detected through the reflection signal is multiple targets, using the relative phase information for each channel.

In addition, another embodiment provides a method for estimating the angle of a target in a radar device for a vehicle, including: a transmission step for transmitting a transmission signal for detecting a target; a reception step for receiving a reflection signal of the transmission signal through a plurality of array antennas; a calculation step for calculating relative phase information for each channel by using the reflection signal received through each of the plurality of array antennas; and a target determination step for determining whether the target detected through the reflection signal is multiple targets, using the relative phase information for each channel.

According to the present embodiment, the angle of the target can be acquired using a small amount of calculations, by determining the target as a single target or multiple targets according to a phase difference for each reception channel of the reflection signal and a dispersion level of the slope for each reception channel calculated through an arrangement interval for each reception channel and estimating the angle of the target.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, preferable embodiments will be described in detail with reference to accompanied drawings.

Figure 1:
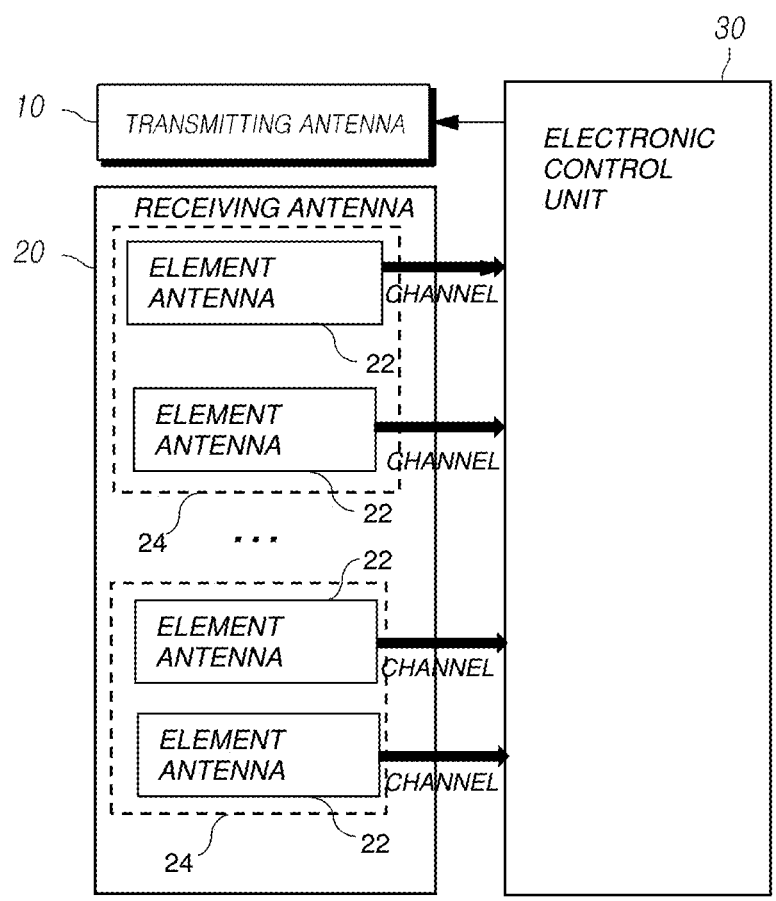
FIG. 1 is a drawing illustrating a block diagram for describing a radar device for a vehicle according to an embodiment.
Figure 2:
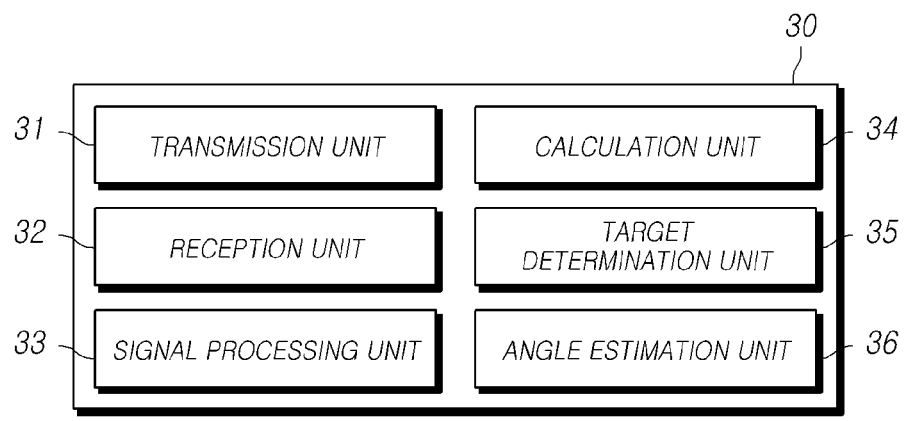
FIG. 2 is a drawing illustrating a block diagram for describing an electronic control unit illustrated in FIG. 1.

FIG. 1 illustrates a block diagram for describing a radar device for a vehicle according to an embodiment, and FIG. 2 illustrates a block diagram for describing an electronic control unit illustrated in FIG. 1.

Referring to FIG. 1, a radar device for a vehicle according to an embodiment may be mounted in the front side of a vehicle and detect a target located in the front of the vehicle.

Such a radar device for a vehicle includes a transmitting antenna 10, a receiving antenna 20, and an electronic control unit 30.

The receiving antenna 20 uses an array antenna having a plurality of element antennas 22 therein, as the receiving antenna. A reflection signal received by each element antenna is transmitted to the electronic control unit 30.

The electronic control unit 30 may receive a reflection signal that is a transmission signal having been transmitted toward the front side of a vehicle through the transmitting antenna 10, and then reflected back from the target located in the front side, calculate a phase difference among reception channels adjacent to each other using a phase difference for each reception channel of the received reflection signal, calculate a slope for each reception channel based on the calculated phase difference and an arrangement interval of the reception channels, and determine whether the target located in the front side is a single target or multiple targets according to a dispersion level of the calculated slope for each reception channel, so as to estimate the angle of the target.

Further, the electronic control unit 30 estimates the angle of a single target with reference to a data table which stores slopes predefined by experience for each angle of a target when the target is determined as a single target, and estimates the angle of multiple targets by applying a high performance decomposition algorithm when the target is determined as multiple targets.

Referring to FIG. 2 for further description, the electronic control device 30 includes a transmission unit 31, a reception unit 32, a signal processing unit 33, a calculation unit 34, a target determination unit 35, and an angle estimation unit 36.

The transmission unit 31 transmits a preconfigured transmission signal through the transmitting antenna 10. Particularly, the transmission unit 31 generates a continuous wave transmission signal to be transmitted to an object in the front side of the vehicle, and transmits the generated continuous wave transmission signal through the transmitting antenna 10. Here, the transmission unit 31 may include a D/A converter for converting a digital signal to an analog signal.

The reception unit 32 receives, through the receiving antenna 20, a reflection signal that is a transmission signal reflected back from the target. Particularly, the reception unit 32 receives a returning continuous wave reflection signal when the continuous wave transmission signal is reflected back. Here, the reception unit 32 may include an A/D converter for converting a received analog signal to a digital signal.

A signal processing unit 33 processes the transmission signal of the transmission unit 31 and the reflection signal received by the reception unit 32. That is, the signal processing unit 33 may process a plurality of reflection signals reflecting back to the transmission signal transmitted by the transmission unit 31, and trace a plurality of distances so as to select a target in the closest distance among a plurality of the traced distances.

The calculation unit 34 calculates a phase difference between two reception channels by using a phase for each reception channel of the reflection signal which is signal-processed by the signal processing unit 33. The phase difference is a value obtained by calculating a phase difference between adjacent reception channels.

In addition, the calculation unit 34 calculates slopes of received signals received for each reception channel, respectively. Here, the slope for each reception channel is a value obtained through division using a phase difference and an arrangement interval of reception channels. The arrangement interval of the reception channel is preconfigured for each corresponding reception channel and corresponds to a difference in the distance between channels with reference to channel zero.

Further, the calculation unit 34 calculates a mean slope obtained by calculating the average of slopes calculated for each reception channel.

The target determination unit 35 determines the target located in the front side as a single target or multiple targets according to a dispersion level of the slope for each reception channel calculated by the calculation unit 34. For further description, the target determination unit 35 determines the target as a single target or multiple targets according to whether a dispersion value of the slope calculated for each reception channel with reference to the mean slope obtained by calculating the average of slopes calculated for each reception channel is equal to or greater than a predetermined value. The dispersion value of the slope is an interval between the mean slope and the slope for each reception channel.

The angle estimation unit 36 estimates the angle of a single target through a data table which stores slopes predefined by theoretical slopes calculated for each angle of the target, i.e., experience when the target determination unit 35 determines the target located in the front side as a single target.

Further, the angle estimation unit 36 estimates the angle of multiple targets by applying a high performance decomposition algorithm thereto when the target determination unit 35 determines the target located in the front side as multiple targets.

Accordingly, the amount of calculation for a single target to which a high performance decomposition algorithm is not required to be applied may be greatly reduced, by determining whether the target located in the front side is a single target or multiple targets. That is, a high performance decomposition algorithm consuming a large amount of calculations is required to be applied in order to improve the angular resolution in a case of multiple targets. However, the angle of a single target may be estimated by expanding the size of the data table which stores theoretical slopes and the angle of the target, and the amount of calculation may be thus greatly reduced in a case of a single target to which a high performance decomposition algorithm is not required to be applied.

A method for estimating the angle of a target using a radar device for a vehicle having such a configuration is described as follows with reference to FIG. 3.

Figure 3:
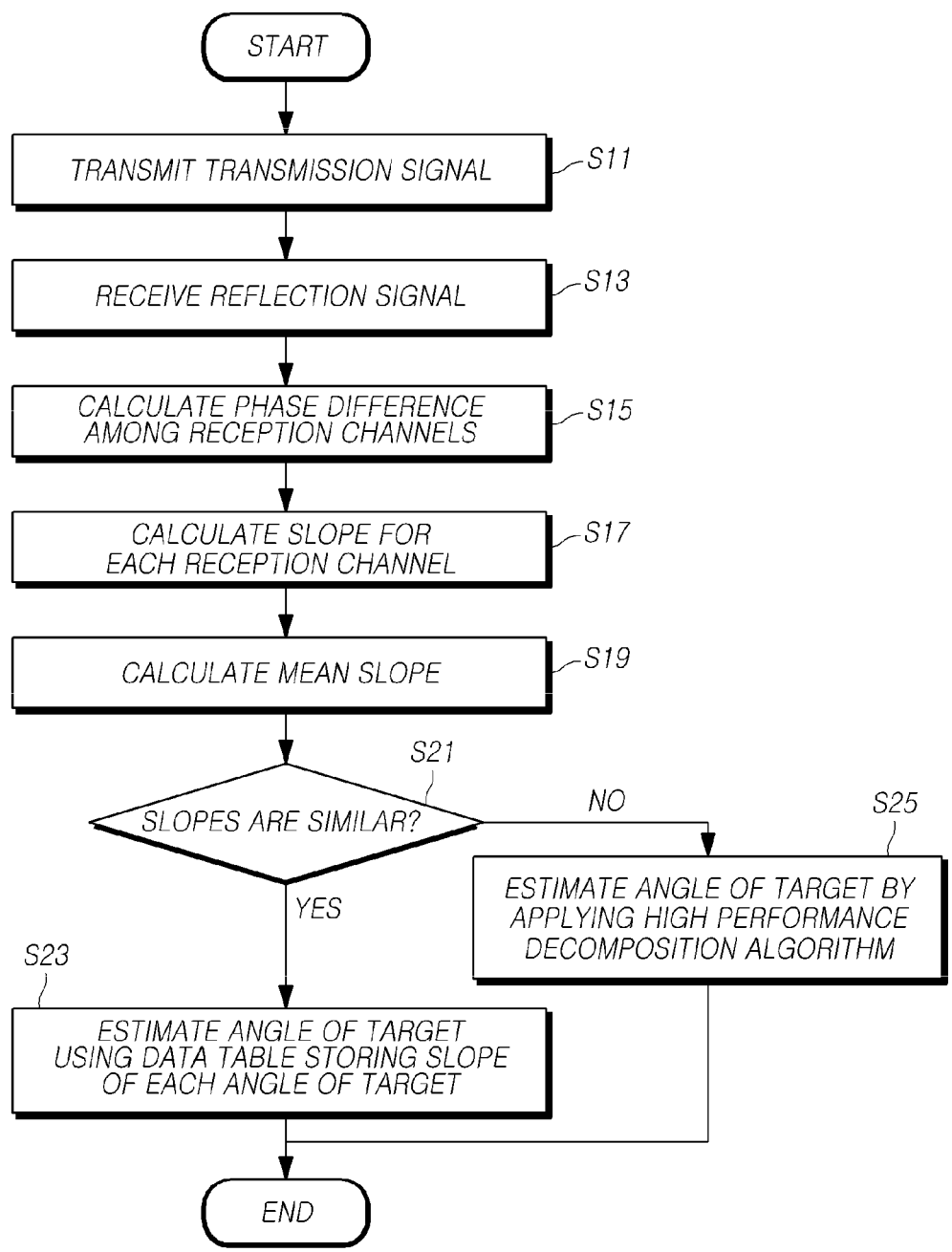
FIG. 3 is a drawing for describing a method for estimating the angle of a target by using a radar device for a vehicle according to another embodiment.

FIG. 3 illustrates an operation flow diagram for describing a method for estimating the angle of a target using a radar device for a vehicle according to another embodiment.

The electronic control unit 30 generates a transmission signal transmitted to an object in the front side of a vehicle, for example, a continuous wave transmission signal, and transmits the generated transmission signal through the transmitting antenna 10 S11.

The electronic control unit 30 receives, through the receiving antenna 20, a reflection signal that is the transmission signal which is transmitted through the transmitting antenna 10 and reflected back from the target S13.

The electronic control unit 30 calculates a phase difference among reception channels arranged adjacent to each other, using a phase for each reception channel of the receiving antenna 20 of the received reflection signal S15.

The electronic control unit 30 calculates a slope for each reception channel S17. The slope for each reception channel is calculated using the phase difference calculated in described step S15 and an arrangement interval appointed to each reception channel.

The electronic control unit 30 calculates a mean slope obtained by calculating the average of slopes for each reception channel S19.

Figure 4:
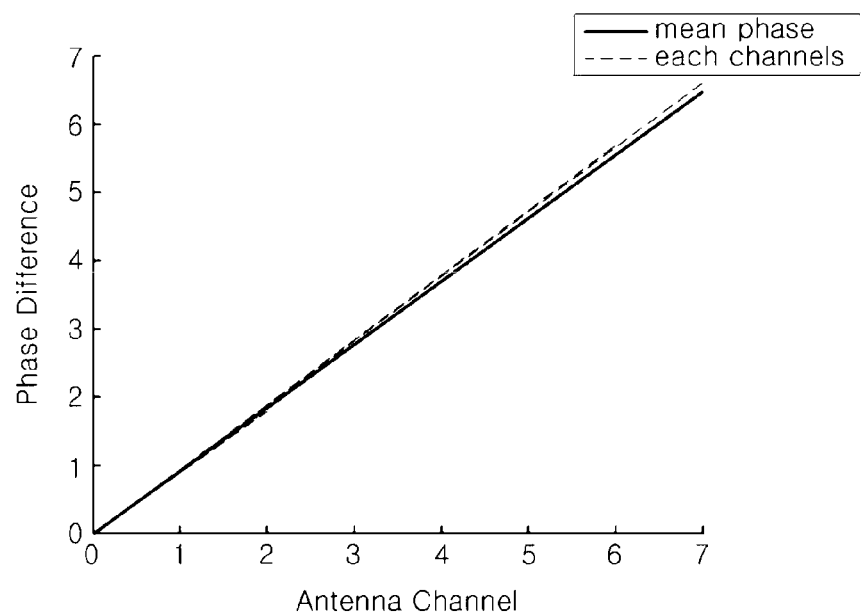
FIGS. 4 and 5 are drawings illustrating a graph that indicates a phase difference among reception channels.
Figure 5:
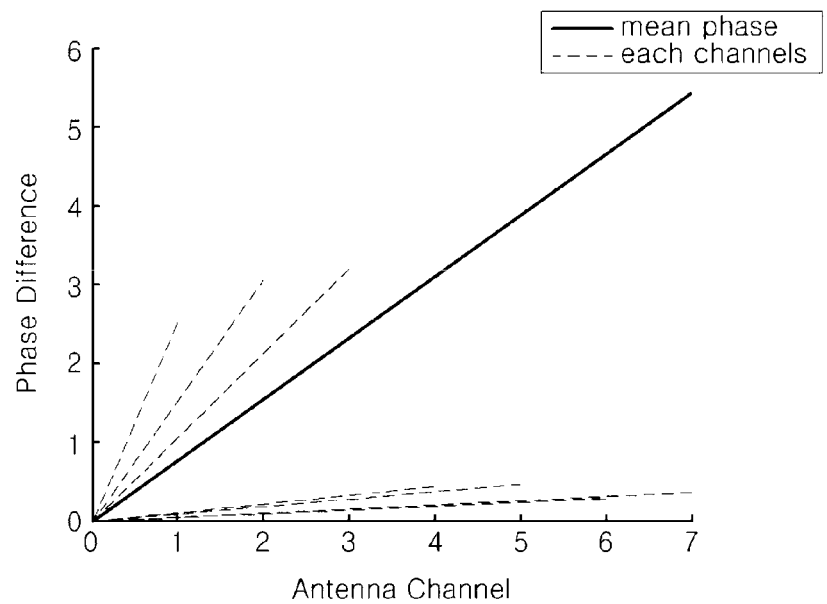

The electronic control unit 30 determines whether the slope for each reception channel is similar with reference to the calculated mean slope S21. That is, the electronic control unit 30 may calculate a dispersion value which indicates an interval of the slope for each reception channel with reference to the mean slope, and determine whether the calculated dispersion value is equal to or greater than a predetermined value. The target located in the front side is determined as a single target when the slope for each reception channel (indicated using a dotted line) is similar with reference to the mean slope (indicated using a solid line) as illustrated in FIG. 4, and the target located in the front side is determined as multiple targets when the slope for each channel (indicated using a dotted line) is dispersed to have a dispersion value equal to or greater than a predetermined dispersion value with reference to the mean slope (indicated using a solid line) as illustrated in FIG. 5.

Figure 6:
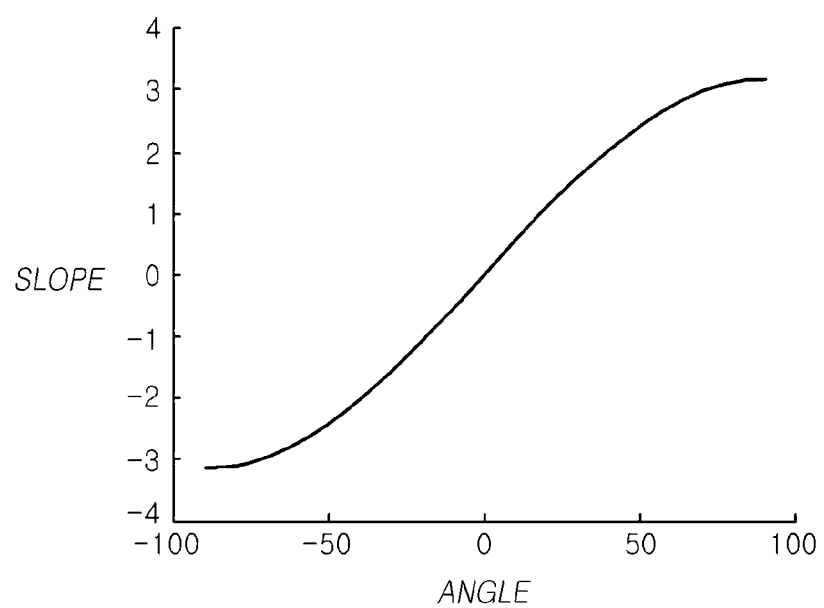
FIG. 6 is a drawing illustrating a graph that indicates a slope predefined based on experience for each angle of a target.

When the slopes are similar based on the result of the determination in step S21, that is, in a case where the slope for each reception channel is similar with reference to the mean slope, the electronic control unit 30 estimates the angle of a single target by using the data table which stores slopes predefined by experience for each angle of a target, as illustrated in FIG. 6 S23. In other words, the electronic control unit 30 estimates the angle of the target corresponding to the mean slope calculated in described step S19, as shown in a graph of FIG. 6 indicating the relationship between the theoretical slope and the angle of the target, in a case of a single target.

When the slopes are not similar based on the result of the determination in step S21, that is, in a case where the slope for each reception channel is dispersed with reference to the mean slope, the electronic control unit 30 estimates the angle of multiple targets by applying a high performance decomposition algorithm thereto S25.

As described above, the angle of a target may be acquired using a smaller amount of caltulations than a conventional angle estimation algorithm, by obtaining and analyzing a phase difference among reception channels by using the phase of a reflection signal received for each reception channel in a radar device having an array antenna scheme.

Particularly, since it may be determined whether a target located in the front side is a single target or multiple targets, the amount of calculations having been required so far may be greatly reduced in relation to estimating an angle while avoiding application of a high performance decomposition algorithm when the target is a single target.

Meanwhile, another embodiment for determining whether a target is multiple targets by a radar device for a vehicle, which includes the electronic control unit described above will follow hereinafter.

Referring to FIG. 2 again, the radar device for a vehicle includes the transmission unit 31 for transmitting a transmission signal for detecting a target. Further, the radar device for a vehicle includes the reception unit 32 for receiving a reflection signal for the transmission signal through a plurality of array antennas. The radar device for a vehicle includes the calculation unit 34 for calculating relative phase information for each channel by using the reflection signal when the reflection signal is received. For example, the radar device for a vehicle may include the receiving antenna 20 having two or more array antennas therein. Each array antenna may be configured as a separate channel. That is, a channel may be configured for each array antenna. The reflection signal may be received through the receiving antenna 20, and may be received through each array antenna constituting the receiving antenna 20. The array antennas are arranged having a predetermined interval. Therefore, when one reflection signal is received through a plurality of array antennas, a difference occurs in phases of reflection signals received by each of the array antennas. In the present specification, such phases of the reflection signal received for each of array antennas are described using phase information for each channel. That is, one array antenna is assumed to constitute one channel, but is not limited thereto. For example, two or more array antennas may be configured to form a channel.

The calculation unit 34 may configure phase information of a preconfigured reference channel as reference phase information, and compare phase information of the reflection signal received for each channel with the reference phase information so as to calculate relative phase information for each channel. The reference channel may be preconfigured or may be changed dynamically according to a configuration by a user. Referring to FIGS. 4 and 5 again for description, the reference channel means antenna channel zero in FIGS. 4 and 5. Further, relative information for each channel means the phase information for each channel in comparison with the reference phase information (zero in FIGS. 4 and 5).

The target determination unit 35 may distinguish whether a target detected through the reflection signal is two or more multiple targets or one single target, using the relative phase information for each channel.

For example, the target determination unit 35 may distinguish whether the target detected through the reflection signal is a single target or multiple targets based on information of a distance difference among the plurality of array antennas and the relative phase information for each channel. Specifically, the target determination unit 35 may calculate ratio information between the information of a distance difference among the plurality of array antennas and the relative phase information for each channel, so as to determine whether the target is multiple targets based on the ratio information. For example, when the reflection signal by a single target is received in a situation where each of the array antennas are arranged by the same interval, relative phase information of channel one is calculated as one, relative phase information of channel two is calculated as two, and relative phase information of channel three is calculated as three, like FIG. 4. Therefore, the target determination unit 35 calculates ratio information using the interval between array antennas of channels zero and one as a denominator and the relative phase information difference in channels zero and one as a numerator. In a case of FIG. 4, ratio information of channels zero and one is calculated as one, and ratio information of channels one and two is also calculated as one. Likewise, ratio information on each of concatenated channels is calculated to be similar within an error range. In this case, the target determination unit 35 determines the target as a single target.

On the other hand, in a case of FIG. 5, relative phase information for channel one is calculated as 2.6, relative phase information for channel two is calculated as 3.1, relative phase information for channel three is calculated as 3.2, relative phase information for channel four is calculated as 0.5, and the like. Therefore, if array antennas included in each channel have an equal interval (e.g., one), the ratio information of channels zero and one is calculated as 2.6, the ratio information of channels one and two is calculated as 0.5, . . . , the ratio information of channels three and four is calculated as −2.7, and the like. Therefore, the target determination unit 35 determines that there is no identicality of differences in the relative phase information for each of the concatenated channels so as to determine the target of the reflection signal as multiple targets.

For another example, the target determination unit 35 may not calculate ratio information using a channel of the concatenated array antennas described above, and configure an array antenna set 24 so as to determine whether a target is multiple targets. To this end, the target determination unit 35 may configure a plurality of array antennas as one or more array antenna sets 24, and determine whether a target is multiple targets based on the information of a distance difference between array antennas included in the array antenna set 24 and the ratio information of relative phase information for each channel. In this case, the array antenna set 24 may be configured to include two array antennas. Further, the target determination unit 35 may configure the array antenna sets 24 such that the information of a distance difference between the array antennas is the same among the array antenna sets 24. For example, the array antenna sets may be configured such that when the interval between two array antennas included in a first array antenna set is N, the interval between two array antennas included in a second array antenna set is also N. N may be configured to be an integer number times of interval K between the concatenated array antennas.

As described above, even in this case, the target determination unit 35 may determine whether the target is multiple targets based on the identicality of the ratio information of each array antenna set. For example, when the difference in ratio information among array antenna sets is included in a preconfigured error range, the target included in the reflection signal is determined as a single target, and when the difference in ratio information among array antenna sets is out of a preconfigured error range, the target included in the reflection signal may be determined as multiple targets.

For another example, the target determination unit 35 may calculate the relative phase information for each channel in a graph like FIG. 4 or FIG. 5, and compare the slope of the relative phase information for each channel with the reference slope so as to determine whether the target is multiple targets. For example, in a case of a single target like FIG. 4, the target may be determined as a single target when the slope of the relative phase information for each channel appears to be similar to the reference slope (the mean phase in FIG. 4). Contrarily, the target may be determined to be multiple targets when the slope of the relative phase information for each channel is different from the reference slope (the mean phase in FIG. 5), like FIG. 5. The reference slope may be preconfigured or may be determined based on the distance between array antennas. Alternatively, the reference slope may be dynamically calculated using the mean slope of graph slopes of the relative phase information for each channel. That is, it may be determined whether the target is multiple targets based on the dispersion of the relative phase information for each channel.

Meanwhile, a method for estimating the angle of a target by a radar device for a vehicle may perform all operations of the radar device for a vehicle described above.

For example, a method for estimating the angle of a target may include: a transmission step for transmitting a transmission signal for detecting a target; a reception step for receiving a reflection signal of the transmission signal through a plurality of array antennas; a calculation step for calculating relative phase information for each channel, using the reflection signal received through each of the plurality of array antennas; and a target determination step for determining whether the target detected through the reflection signal is multiple targets, using the relative phase information for each channel. The calculation step may include calculating the relative phase information for each channel with reference to phase information of a reference channel. In addition, the target determination step may include determining whether the target is multiple targets, using distance information between array antennas and ratio information of the relative phase information for each channel, as described above. To this end, the target determination step may include configuring array antenna sets, and checking whether each of the array antenna sets has the same ratio information, so as to identify whether the target is multiple targets. Alternatively, as described above, the target determination step may include determining whether the target is multiple targets based on whether the slope of a graph for each piece of the relative phase information is the same as the reference slope.

When it is determined whether the target is multiple targets, an algorithm for estimating the angle of the target may be selected to estimate the angle of the target. Further, a first algorithm may be selected when the target is determined as a single target, and a second algorithm may be selected when the target is determined as multiple targets. Here, the first algorithm and the second algorithm may be pre-stored and the amount of calculation of the second algorithm may be greater than that of the first algorithm.

In addition, a method for estimating the angle of a target may perform, as necessary, some or all of operations of the radar device for a vehicle, which are described above.

The present embodiments may not be limited to the embodiments described above, may have various modifications and changes by persons skilled in the art, and may be included in the range of the purpose of the present technical idea defined by accompanying claims.

DESCRIPTION OF REFERENCE NUMERALS

10: transmitting antenna
20: receiving antenna
30: electric control unit
31: transmission unit
32: reception unit
33: signal processing unit
34: calculation unit
35: target determination unit
36: angle estimation unit

What is claimed is:

1. A radar device for a vehicle, comprising:
a transmission unit configured to transmit a transmission signal for detecting one or more targets;
a reception unit configured to receive a reflection signal of the transmission signal through a plurality of array antennas, each of the plurality of array antennas respectively corresponding to one of channels; and
an electronic control unit configured to:
calculate relative phase information for each of the channels, using the reflection signal received through each of the plurality of array antennas, and
determine whether the one or more targets detected through the reflection signal are a single target or multiple targets, using the relative phase information for each of the channels, wherein the plurality of array antennas are grouped by one or more array antenna sets and each of the one or more array antenna sets includes two array antennas, and the electronic control unit is configured to determine whether the one or more targets detected through the reflection signal are a single target or multiple targets based on a distance between the two array antennas and a ratio of the relative phase information between two channels corresponding to the two array antennas.

2. The radar device for a vehicle of claim 1, wherein the electronic control unit is configured to configure phase information of a preconfigured reference channel as reference phase information, and calculate a difference between each piece of phase information for each channel with respect to the reflection signal and the reference phase information, so as to generate relative phase information for each channel with respect to the reference phase information.

3. The radar device for a vehicle of claim 1, wherein one distance between two array antennas of one of the one or more array antenna sets is the same as another distance between two array antennas of another of the one or more array antenna sets.

4. The radar device for a vehicle of claim 3, wherein the electronic control unit is configured to determine whether the one or more targets detected through the reflection signal are a single target or multiple targets with reference to whether the array antenna sets have the same ratio of the relative phase information as each other.

5. The radar device for a vehicle of claim 3, wherein the electronic control unit is configured to determine the one or more targets detected through the reflection signal as a single target when a difference in ratio of the relative phase information of the array antenna sets is included in a preconfigured error range, and determine the one or more targets included in the reflection signal as multiple targets when the difference in the ratio of the relative phase information of the array antenna sets is out of the preconfigured error range.

6. A method for estimating the angle of a target in a radar device for a vehicle, comprising:
transmitting a transmission signal for detecting one or more targets;
receiving a reflection signal of the transmission signal through a plurality of array antennas, each of the plurality of array antennas respectively corresponding to one of channels;
calculating relative phase information for each of the channels, using the reflection signal received through each of the plurality of array antennas; and
determining whether the one or more targets detected through the reflection signal are a single target or multiple targets, using the relative phase information for each of the channels,
wherein the plurality of array antennas are grouped by one or more array antenna sets and each of the one or more array antenna sets includes two array antennas, and the determining whether the one or more targets are a single target or multiple targets comprises determining whether the one or more targets detected through the reflection signal are a single target or multiple targets based on a distance between the two array antennas and a ratio of the relative phase information between two channels corresponding to the two array antennas.

7. The method for estimating the angle of a target in a radar device for a vehicle of claim 6, phase information of a preconfigured reference channel is configured as reference phase information, and wherein the method further comprises calculating a difference between each piece of phase information for each channel with respect to the reflection signal and the reference phase information, so as to generate relative phase information for each channel with respect to the reference phase information.

8. The method for estimating the angle of a target in a radar device for a vehicle of claim 6, wherein one distance between two array antennas of one of the one or more array antenna sets is the same as another distance between two array antennas of another of the one or more array antenna set, and
the determining whether the one or more targets are a single target or multiple targets comprises determining whether the one or more targets detected through the reflection signal are a single target or multiple targets with reference to whether the array antenna sets have the same ratio of the relative phase information as each other.

9. The method for estimating the angle of a target in a radar device for a vehicle of claim 6, wherein the determining whether the one or more targets detected through the reflection signal are a single target or multiple targets comprises: determining the one or more targets through the reflection signal as a single target when a difference in the ratio of the relative phase information of the array antenna sets is included in a preconfigured error range, and determining the one or more targets detected through the reflection signal as multiple targets when the difference in the ratio of the relative phase information of the array antenna sets is out of the preconfigured error range.

* * * * *